United States Patent [19]

Kobayashi

[11] 4,232,349
[45] Nov. 4, 1980

[54] MODE SWITCHING MECHANISM FOR A CASSETTE TAPE RECORDER

[75] Inventor: Minoru Kobayashi, Hachioji, Japan

[73] Assignee: Olympus Optical Co., Ltd., Tokyo, Japan

[21] Appl. No.: 28,897

[22] Filed: Apr. 10, 1979

[30] Foreign Application Priority Data

Apr. 20, 1978 [JP] Japan .................................. 53/46838

[51] Int. Cl.² .......................... G11B 5/54; G11B 21/22
[52] U.S. Cl. ..................................... 360/105; 360/137
[58] Field of Search ................................ 360/105, 137

[56] References Cited

U.S. PATENT DOCUMENTS

| | | | |
|---|---|---|---|
| 4,050,088 | 9/1977 | Okuda | 360/105 |
| 4,149,203 | 4/1979 | Kobayashi et al. | 360/105 |

*Primary Examiner*—Robert S. Tupper

[57] ABSTRACT

A mode switching mechanism for a cassette tape recorder is provided with an operation member slidable from neutral position in either of opposite directions. The movement of the operation member is transmitted via a rockable switching lever to a support lever which supports a pinch roller and a magnetic head. The support lever is rocked from a stop mode position to a play mode position or a record mode position, thereby bringing the pinch roller and magnetic head into contact with a magnetic tape. The switching lever is biased by a spring to rock around a first fulcrum member or a second fulcrum member. The operation member has first and second contacts. When the operation member is slid from the neutral position in either direction, the first or second contact hits and rocks the switching lever around the first or second fulcrum member against the force of the spring. Since the switching lever is rocked about the first or second fulcrum member, the distance between either fulcrum member and the point where either contact hits the switching member is sufficiently long whichever direction the operation member is slid.

9 Claims, 6 Drawing Figures

MODE SWITCHING MECHANISM FOR A CASSETTE TAPE RECORDER

BACKGROUND OF THE INVENTION

This invention relates to a mode switching mechanism for a cassette tape recorder, and more particularly a mode switching mechanism which changes one mode to another by sliding an operation member from neutral position in either of opposite directions.

Recently various cassette tape recorders have been provided, which use a tape cassette having a surface area about one-fourth the surface area of a known tape cassette. They are now increasingly used at conference or meeting to take the place of memo pads. Such a cassette tape recorder should be small, light and easy to operate by a single hand. Most known cassette tape recorder of this type have three buttons arranged in a row, i.e. a stop button, a play button and a record button. The user selectively pushes these buttons to select stop mode, record mode or play mode. The mode switching mechansim to achieve such a mode selection, however, is complicated, and the mode switching is relatively intricate.

To lessen the intricacy of mode switching, there has been invented a mode switching mechanism with a single operation member which is kept at neutral position and slid from the neutral position in either of opposite directions. The operation member includes an operation button and is set at the neutral position to select stop mode and slid from the neutral position in either direction to select play mode or record mode. Whenever the operation member is slid in either direction, a magnetic head and a pinch roller must be put into contact with a magnetic tape. To put the magnetic head and pinch roller unfailingly in this manner, a rockable switching lever is provided between the operation member and a support lever which supports both the head and the pinch roller. The switching lever is rocked to move the support lever to the magnetic tape when the operation member is slid in either direction. More specifically, the switching lever is pushed by one of two contact strips secured to the operation member to rock in the direction in which the operation button is slid. To slide the operation button with a small force, utilizing the principle of lever, the points where the switching lever contacts either contact strip must be fully spaced from the fulcrum of the switching lever. In other words, both contact strips should be located as far as possible from the fulcrum of the switching lever. As a result, the operation member including the operation button and the contact strips will become large, making it difficult to miniaturize the cassette tape recorder.

SUMMARY OF THE INVENTION

It is an object of this invention to provide a mode switching mechanism for a cassette tape recorder, which has a simple construction and can yet facilitate the operation of the tape recorder without hindering miniaturization of the tape recorder. To achieve the object, a mode switching mechanism according to this invention comprises a switching lever which is biased with a spring at a first fulcrum and a second fulcrum. The mode switching mechanism further comprises an operation member with a first contact and a second contact. Either contact pushes the switching lever whenever the operation member is slid from neutral position in either of opposite directions, thereby rocking the switching lever against the bias of the spring about the first fulcrum or the second fulcrum, depending on the direction in which the operation member has been slid. The distance between either fulcrum of the switching lever and the point where the switching lever contact either contact strip is sufficiently long whichever direction the operation member is slid.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENT

Figure 1:
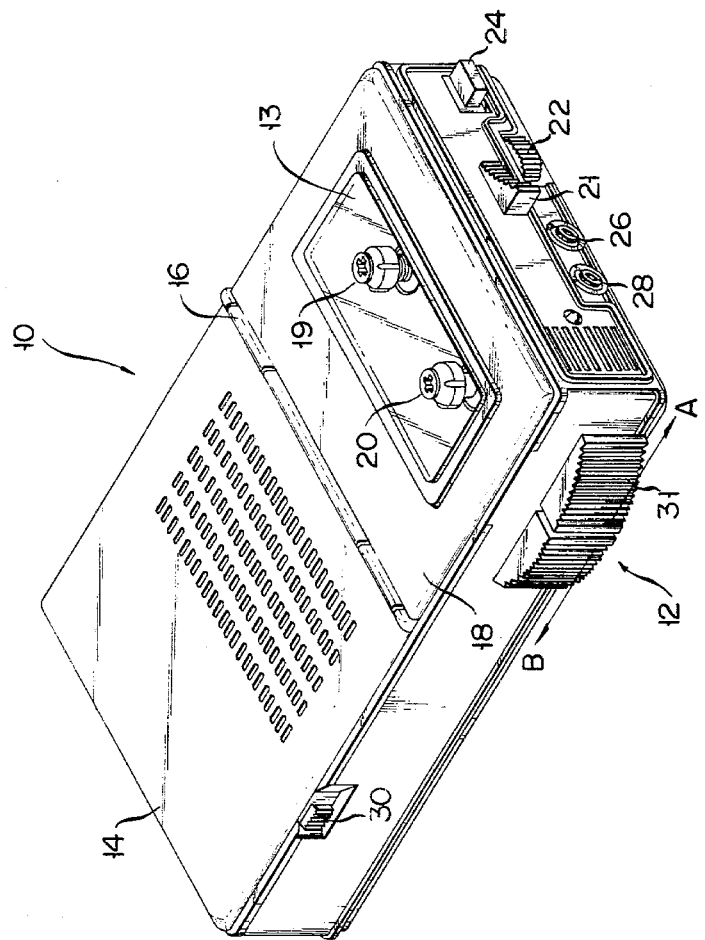
FIG. 1 is a perspective view of a cassette tape recorder equipped with a mode switching mechanism according to this invention.

As shown in FIG. 1, a cassette tape recorder 10 equipped with a mode switching mechanism 12 according to this invention comprises a recorder body 14 with a cassette pocket 13. The cassette pocket 13 is usually covered with a cover 18 which is attached to the recorder body 14 by means of a hinge 16. In the cassette pocket 13 a pair of reel shafts 19 and 20 protrude. On the top of the recorder body 14 there are arranged a shift button 21, a volume button 22, an eject button 24, a microphone jack 26 and an earphone jack 28. On one side of the recorder body 14 there are arranged a power switch 30 and an operation button 31 which is a constituent member of the mode switching mechanism 12.

Figure 2:
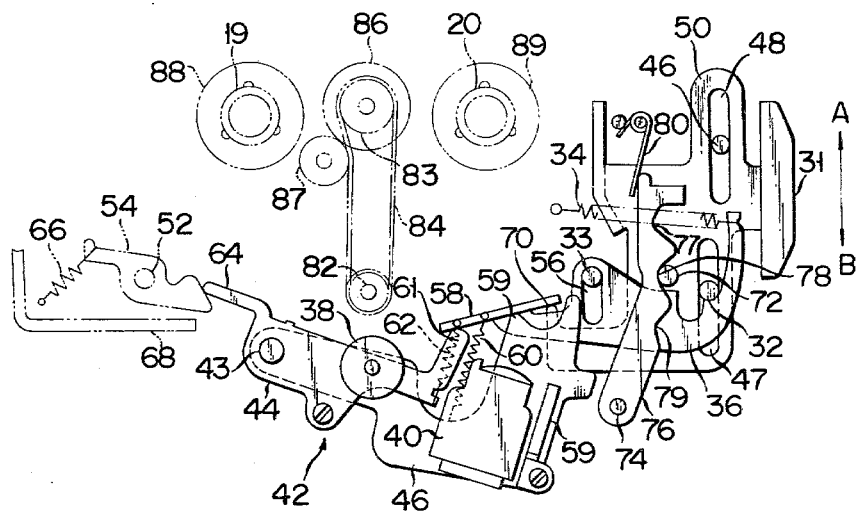
FIG. 2 is a plan view of a mode switching mechanism according to this invention in neutral position, thus selecting stop mode.
Figure 3:
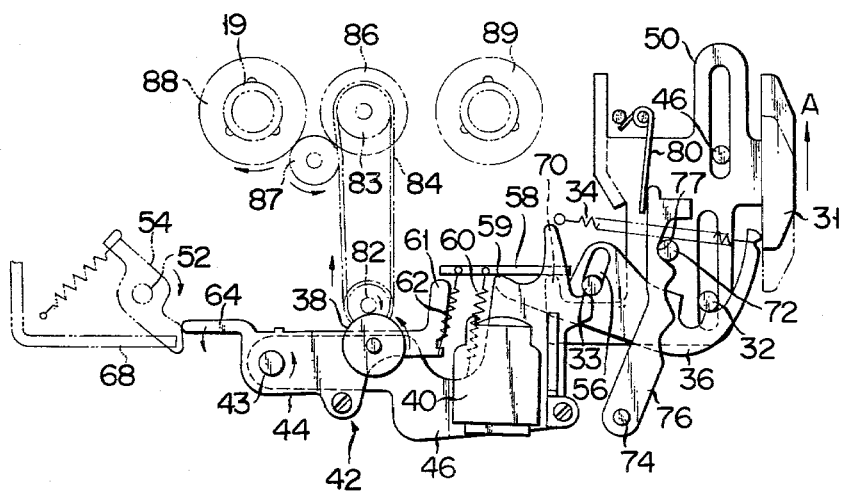
FIG. 3 is a plan view of the mode switching mechanism operating to change stop mode to record mode.
Figure 4:
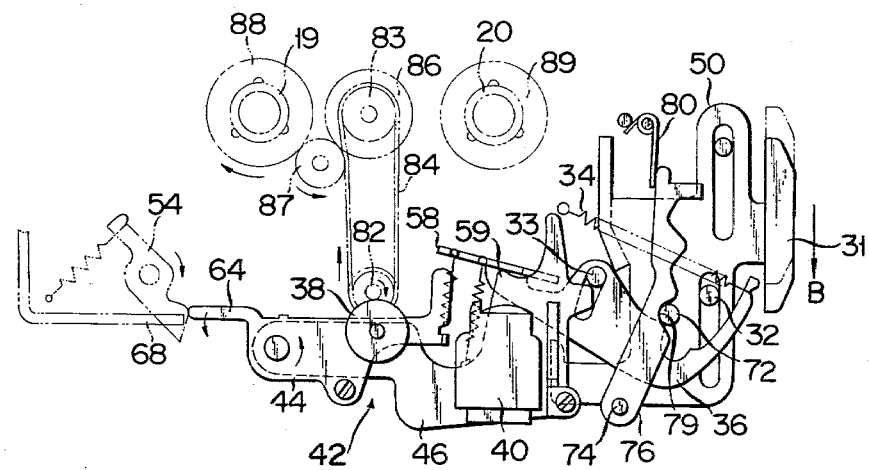
FIG. 4 is a plan view of the mode switching mechanism operating to change stop mode to play mode.

The mode switching mechanism 12 is so constructed as illustrated in FIGS. 2 to 4. The mechanism 12 may be put in neutral position to select stop mode as shown in FIG. 2, in a first position to select record mode as shown in FIG. 3 or in a second position to select play mode as shown in FIG. 4.

The mode switching mechanism 12 comprises a rockable switching lever 36. the switching lever 36 is usually put in the neutral position, being biased by a spring 34 and thus held in contact with a first fulcrum pin 32 and a second fulcrum pin 33 which are secured to a base plate (not shown). The mechanism 12 further comprises a rockable support lever 42 supporting a pinch roller 38 and a magnetic head 40. The support lever 42 is constituted by a pinch roller lever 44 and a head lever 46. Instead, it may be constituted by a single lever for supporting both the pinch roller 38 and the head 40. Still further, the mechanism 12 is provided with an operation member 50 which is integrally formed with the operation button 31. The operation member 50 has two guide holes 47 and 48 which receive the first fulcrum pin 32 and a guide pin 46 secured to the base plate (not shown), respectively. The operation member 50 slides in either direction indicated by arrow A or B in FIG. 2 while being guided by the first fulcrum pin 32 and the guide pin 46, whenever the operation button 31 is pushed in either direction.

The second fulcrum pin 33 is constituted by one of two pins for positioning a tape cassette (not shown). The other positioning pin is used as a fulcrum pin 52 of an eject stopper 54, which will be described hereinafter. Since the pins for positioning a tape cassette are utilized as the second fulcrum pin 33 and the fulcrum pin 52 of the eject stopper 54, the mode switching mechanism 12 is comprised of less members than otherwise and is simplified.

The switching lever 36 has an elongated hole 56, in which the second fulcrum pin 33 is loosely inserted. The elongaged hole 56 should preferably be arcuate so as to allow the lever 36 to rock smoothly around the first fulcrum pin 32. A strip 58 is integrally formed with the switching lever 36 and protruding at right angle with respect to the plane in which the lever 36 lies. When the operation button 31 is pushed in the direction of arrow A, the strip 58 is pushed by the operation member 50 to rock the switching lever 36 clockwise around the first fulcrum pin 32 against the bias of the spring 34 as shown in FIG. 3. As a result, the stop mode is changed to the record mode. On the other hand, when the button 31 is pushed in the direction of arrow B, the strip 58 is pushed by the member 50 to rock the switching lever 36 counterclockwise around the pin 32 against the bias of the spring 34 as shown in FIG. 4. In this case, the stop mode is changed to the play mode.

Both the pinch roller lever 44 and the head lever 46 are rockably supported at one end by a pin 43 secured to the base plate (not shown). The head lever 46 has its free end 59 protruded toward the strip 58 of the switching lever 36. The free end 59 of the head lever 46 is kept in contact with the strip 58 of the switching lever 36 by a coil spring 60 attached at one end to the strip 58 and at the other end to the free end 59. The head lever 46 is provided with a tape guide. The pinch roller lever 44 has its free end 61 protruded toward the strip 58, too. The free end 61 is kept in contact with the strip 58 by a coil spring 62 attached at one end to the strip 58 and at the other end to the free end 61. The pinch roller lever 44 has at the other end an engaging strip 64 which contacts one end of the eject stopper 54. The engaging strip 64 rocks the eject stopper 54 clockwise against the bias of a spring 66 when the pinch roller 44 is rocked counterclockwise as shown in FIGS. 3 and 4. Once rocked clockwise by the engaging strip 64, the eject stopper 54 is positioned above an eject lever 68 connected to the eject button 24 and thus prevents the eject lever 68 from ejecting a tape cassette (not shown). That is, while the record or stop mode is selected, the tape cassette would never be mistakenly ejected. The eject stopper 54, which functions in interlock with the support lever 42, prevents an erroneous cassette ejection with fail.

The operation member 50 has its right end integrally formed with the operation button 31 and its left end a contact member as a first contact 70 to come into contact with the strip 58 of the switching lever 36. A contact pin 72 as a second contact is protruding from the central part of the operation member 50. The contact member 70 is to push the switching lever 36 when the operation button 31 is pushed in the direction of arrow A or B. The contact pin 72 is to contact the switching lever 36 when the operation button 31 is pushed the switching lever 36 when the button 31 is pushed in the direction of arrow B. Their functions being such, both the contact member 70 and the contact pin 72 may be pins or strip members. The contact pin 72 is located between the fulcrum pins 32 and 33, and the contact member 70 is positioned near the second fulcrum pin 33 but not between the fulcrum pins 32 and 33. To push the operation button 31 with less force, the contact pin 72 may be provided near the first fulcrum pin 32 but not between the fulcrum pins 32 and 33. Instead, to reduce the size of the operation member 50, the contact member 70 may be located between the fulcrum pins 32 and 33, too. In other words, the positions of these contact 70 and 72 should be determined, taking into consideration both the question of how easily the button 31 should be operated and the question of how small the operation member 50 should be made.

The contact member 70 pushes the strip 58 to rock the switching lever 36 as illustrated in FIG. 3 when the operation button 31 and thus the operation member 50 are slid in the direction of arrow A. The contact pin 72 pushes the switching lever 36 as shown in FIG. 4 when the operation button 31 and thus the operation member 50 are slid in the direction of arrow B.

The mode switching mechanism is further provided with a detain lever 76 which is rockably supported by a pin 74 secured to the base plate (not shown). The detain lever 76 has three detaining notches 77, 78 and 79 on one side, each for temporarily detaining the contact pin 72 of the operation member 50. These notches 77, 78 and 79 should preferably be U-shaped or V-shaped so as to detain the contact pin 72 steadfastly enough. The detain lever 76 is biased onto the contact pin 72 by a torsion spring 80. The pin 72 is detained in the notch 78 so long as the operation member 50 stays at the neutral position. It is detained in the notch 77 when the operation member 50 is slid from the neutral position in the direction of arrow A thereby to select the record mode, as illustrated in FIG. 3. It is detained in the notch 79 when the operation member 50 is slid in the direction of arrow B to select the play mode, as shown in FIG. 4. In this way the detain lever 76 detain the operation member 50 selectively at three positions without fail.

As FIG. 2 illustrates, a capstan shaft 82 is provided near the pinch roller 38. The capstan shaft 82 is driven by an electric motor (not shown) and drives in turn a pulley 83 by means of an endless belt 84. The pulley 83 is concentrically secured to a larger pulley 86. The pulley 86 is held in contact with an idler pulley 87 which pushes the endless belt 84. The pulleys 83, 86 and 87 are mounted on a rockable lever (not shown). This rockable lever rocks clockwise or counterclockwise whenever the operation member 50 is slid. When the rockable lever rocks in either direction, the idler pulley 87 comes into contact with a reel table 88 with a reel shaft 19, or the pulley 86 comes into contact with another reel table 89 with a reel shaft 20, whereby the reel table 88 or 89 is rotated.

Though not shown in the drawing, an erasing head is provided near the magnetic head 40. The erasing head is moved in the direction of arrow A when the operation member 50 is slid in the same direction.

Now it will be described in detail how the mode switching mechanism of the above-described construction operates to change one mode to another.

First, the power switch 30 shown in FIG. 1 is pushed to on-position. Then the operation button 31 is pushed in the direction of arrow A or B, thereby sliding the operation member 50 in either direction. If the operation member 50 is slid in the direction of arrow A, the stop mode is changed to the record mode in the following manner.

Figure 5:
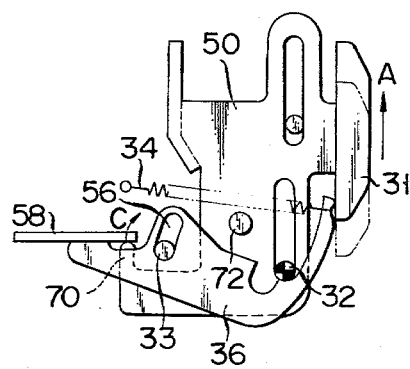
FIG. 5 illustrates how the operation member and switching lever of the mode switching mechanism work to change stop mode to record mode.

That is, as the operation member 50 is slid in the direction of arrow A as illustrated in FIG. 5, the contact member 70 comes into contact with the strip 58 of the switching lever 36 and pushes the strip 58 to rock the switching lever 36 clockwise about the first fulcrum pin 32 against the bias of the spring 34 until one end of the elongated hole 56 comes into contact with the second fulcrum pin 33. The point where the strip 70 contact the strip 58 is so far from the first fulcrum pin 32 that the switching lever 36 is easily rocked owing to the principle of lever if the pushing force on the button 31 is small. As soon as the switching lever 36 is rocked, the electric motor (not shown) starts driving the capstan shaft 82 via an endless belt and a capstan wheel (both not shown). At the same time, both the pinch roller lever 44 and the head lever 46 rock counterclockwise, being urged by the springs 60 and 62, as the strip 58 moves in the direction of arrow C. The pinch roller 38 is then pushed onto the capstan shaft 82 with a magnetic tape between them, and the magnetic head 40 comes into contact with the magnetic tape. Though not shown in FIG. 5, the erasing head comes into contact with the tape, too. As the operation member 50 is slid in the direction of arrow A, the rockable lever (not shown) supporting the pulleys 83, 86 and 87 is rocked so as to bring the idler pulley 87 into contact with the reel table 88. As a result, the reel table 88 is turned clockwise, and the reel shaft 19 takes up the magnetic tape. The magnetic tape is erased by the erasing head (not shown), and then sound is recorded on the tape by the magnetic head 40. When the operation member 50 is slid in the direction of arrow A to change the stop mode to the record mode, the contact pin 72 also moves to rock the detain lever 76 counterclockwise against the bias of the torsion spring 80 until it slips out of the detain notch 78 then into the detain notch 77. Once the pin 72 has been caught in the notch 77, the operation member 50 is held steadfastly so that the tape recorder 10 is kept in the record mode.

Figure 6:
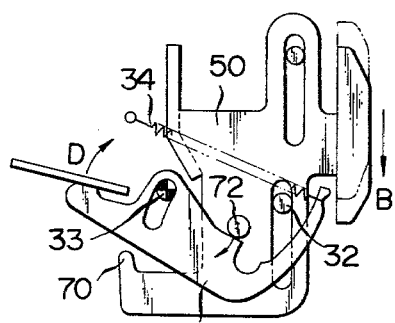
FIG. 6 illustrates how the operation member and switching lever of the mode switching mechanism work to change stop mode to play mode.

If the operation member 50 is slid in the direction of arrow B as illustrated in FIG. 6, the stop mode is changed to the play mode in the following manner. As the member 50 is slid in the direction of arrow B, the contact pin 72 contacts the switching lever 36 and rocks the same clockwise about the second fulcrum pin 33. The point where the pin 72 contacts the switching lever 36 is far enough from the second fulcrum pin 33 to rock the lever with a relatively small force. As soon as the lever 36 is rocked in this way, the motor starts rotating the capstan shaft 82 clockwise. At the same time, both the pinch roller lever 44 and the head lever 46 rock counterclockwise, being urged by the springs 60 and 62, as the strip 58 of the switching lever 36 moves in the direction of arrow D. The pinch roller 38 is then pushed onto the capstan shaft 82, and the magnetic head 40 comes into contact with the magnetic tape. Blocked by the member 50 slid in the direction of arrow B, the erasing head cannot be brought into contact with the tape. As the operation member 50 is slid in the direction of arrow B, the rockable lever (not shown) supporting the pulleys 83, 86 and 87 is rocked so as to bring the idler pulley 87 into contact with the reel table 88. As a result, the reel is turned clockwise, and the reel shaft 19 takes up the magnetic tape. The sound is reproduced by the magnetic head 40 from the running tape. When the operation member 50 is slid in the direction of arrow B to change the stop mode to the play mode, the contact pin 72 slips out of the detain notch 78 and into the detain notch 79. Once the pin 72 has been caught in the notch 79, the operation member 50 is held steadfastly so that the tape recorder 10 is kept in the play mode unfailingly.

As described above, the mode switching mechanism according to this invention comprises a first fulcrum pin 32 and a second fulcrum pin 33 spaced from each other and a switching lever 36 biased by a spring 34 to rock around the fulcrum pin 32 or 33. The mechanism further comprises an operation member 50 which can slide from neutral position in either of opposite directions and which has a first contact 70 and a second contact 72. When the member 50 is slid in one direction, the first contact 70 pushes and rocks the switching lever 36 about the first fulcrum pin 32 against the bias of the spring 34. When the member 50 is slid in the other direction, the second contact 72 pushes and rocks the switching lever 36 about the second fulcrum pin 33 against the bias of the spring 34. Since the switching lever 36 is rocked about either of two fulcrum pins 32 and 33, not about a single fulcrum pin, when the operation member 50 is slid in either direction, the point where the contact 70 or 72 contacts the switching lever 36 is sufficiently spaced from the pin 32 or 33 about which the lever 36 is rocked. The operation member 50 can therefore be slid with a small force unless it is made large, and the switching lever 36 can thus be rocked smoothly. That is, the operation button 31 can be pushed lightly, whereby the mode switching is achieved easily.

What is claimed is:

1. A mode switching mechanism for a cassette tape recorder, comprising a first fulcrum member and a second fulcrum member, a rockable support lever supporting a pinch roller and a magnetic head, an operation member slidable from neutral position in either of opposite directions, a switching lever which is rocked when the operation member is slid in either direction, so as to rock the support lever from stop mode position into record mode position or play mode position, characterized in that said switching lever is biased by a spring to rock around said first fulcrum member or said second fulcrum member and that said operation member has a first contact for rocking said switching lever about the first fulcrum member against the bias of the spring when the operation member is slid in one direction and a second contact for rocking said switching lever about the second fulcrum member against the bias of the spring when the operation member is slid in the other direction.

2. A mode switching mechanism according to claim 1, wherein the second contact member of said operation member is located between the first and second fulcrum members, and the first contact member thereof is located near the second fulcrum member but not between the first and second fulcrum members.

3. A mode switching mechanism according to claim 2, wherein said support lever is biased by a spring toward a magnetic tape, and said switching lever has a strip which prevents said support lever from moving toward the magnetic tape.

4. A mode switching mechanism according to claim 3, wherein the spring for biasing said support lever is provided between said support lever and said switching lever.

5. A mode switching mechanism according to claim 2, wherein a rockable eject stopper is provided near a rockable eject lever and biased by a spring, said support lever has a strip engageable with said rockable eject stopper, said strip coming into engagement with the eject stopper when said support lever rocks in interlock with said switching lever so as to rock the eject stopper against the spring biasing the eject stopper, thereby preventing the eject lever from functioning.

6. A mode switching mechanism according to claim 1, 2 or 5, wherein said second fulcrum member is one of two pins for positioning a tape cassette, and the other pin functions as a fulcrum pin for the eject stopper.

7. A mode switching mechanism according to claim 6, wherein said first fulcrum member extends through an elongated hole formed in said operation member and functions a guide pin for guiding said operation member when said operation member is slid either direction.

8. A mode switching mechanism according to claim 7, wherein said second fulcrum member extends through an elongated hole formed in said switching lever and restricts the rocking of said switching lever by coming into contact with either end of the elongaged hole.

9. A mode switching mechanism according to claim 1, 2 or 5, wherein the second contact of said operation member is a pin secured to said operation member, and there is further provided a rockable detain lever having three detain notches and biased by a spring to detain the second contact in one of the detain notches, the middle detain notch detaining the second contact while said operation member is at neutral position.

* * * * *